United States Patent [19]

Monquin et al.

[11] Patent Number: 4,811,629
[45] Date of Patent: Mar. 14, 1989

[54] DIFFERENTIAL LOCKING DEVICE

[75] Inventors: Félix Monquin, Villeurbanne; Bernard Condamin, Lyon, both of France

[73] Assignee: Renault Vehicules Industriels, Lyon, France

[21] Appl. No.: 757,912

[22] Filed: Jul. 22, 1985

Related U.S. Application Data

[63] Continuation of Ser. No. 445,718, Nov. 30, 1982, abandoned.

[30] Foreign Application Priority Data

Nov. 30, 1981 [FR] France ................. 81 22364

[51] Int. Cl.⁴ .............................................. F16H 1/44
[52] U.S. Cl. ..................................... 74/710.5; 74/713
[58] Field of Search ..................... 74/710, 710.5, 713, 74/711

[56] References Cited

U.S. PATENT DOCUMENTS

| | | | |
|---|---|---|---|
| 1,469,190 | 9/1923 | Ormsby | 74/710.5 |
| 2,569,533 | 10/1951 | Morgan | 74/711 |
| 2,720,796 | 10/1955 | Schou | 74/711 |
| 2,785,588 | 3/1957 | Sampietro | 74/711 |
| 3,499,349 | 3/1970 | Hausinger | 74/710.5 |
| 3,534,633 | 10/1970 | Chocholek | 74/711 |
| 3,572,165 | 3/1971 | Roper | 74/711 |
| 3,577,888 | 5/1971 | Awarth | 74/711 |

FOREIGN PATENT DOCUMENTS

| | | |
|---|---|---|
| 0080947 | 6/1983 | European Pat. Off. . |
| 655398 | 1/1938 | Fed. Rep. of Germany . |
| 1158997 | 6/1958 | France . |
| 1310946 | 10/1962 | France . |
| 2380159 | 9/1978 | France . |

Primary Examiner—Kenneth J. Dorner
Assistant Examiner—David Novais
Attorney, Agent, or Firm—Burgess, Ryan & Wayne

[57] ABSTRACT

A friction-based device for partial locking of a motor vehicle differential with at least one elastic friction segment between one or more sun gears of the differential and the crown gear driving the vehicle wheels, the at least one elastic segment contained under compression in a hole bored on the differential housing, the segment exerting radial pressure on the inside surface of the hole.

This arrangement is particularly suitable for partial locking of the motor differential(s) for heavy road vehicles.

2 Claims, 2 Drawing Sheets

DIFFERENTIAL LOCKING DEVICE

This application is a continuation of application Ser. No. 445,718 filed Nov. 30, 1982 now abandoned.

FIELD OF THE INVENTION

This invention concerns a device for partial locking of a motor vehicle differential, designed to increase the torque transmitted by friction between the left-hand and right-hand wheels of the differential axle, when these wheels are revolving at different angular speeds, thereby reducing the risk of the vehicle skidding because of lack of adherence on one of the driving wheels.

DESCRIPTION OF THE PRIOR ART

Conventional differentials are usually formed of a bevel gear train, and comprising a gear housing/crown wheel assembly driven by a transmission shaft and carrying planet-gear shafts and planet gears as well as the two sun wheels, one for each wheel shaft, and they enable the same driving torque to be imparted to left-hand and right-hand driving wheels, even when they are revolving at different speeds, for example on curves. If the wheels on one side of the vehicle are no longer adhering to the road surface, because of its condition (e.g. ice, or patch of mud), the vehicle loses all driving power, as the wheel without adherence races, and the transmission is subjected to considerable stress when adherence is regained.

In cross-country vehicles, a wheel lacking adherence is prevented from racing by a four-wheel drive system, which provides positive locking of the differential. Such locking is controlled by the driver, and makes the sun gears integral in rotation with the driving crown wheel, driven by the conical pinion.

For ordinary road vehicles, there is little risk of skidding, and the system adopted for cross-country vehicles would unnecessarily increase costs. Such vehicles are therefore fitted with an automatic differential-locking system, by friction or jamming: if adherence is lost on one side of the vehicle, this device allows enough torque to be transmitted to the wheels on the other side to enable the vehicle to get away from an area where one side is failing to adhere.

There are drawback in the automatic partial differential-locking devices used in the prior art: for friction systems based on axial separation of bevel wheels, these include variation in the conical distance of differential toothing, because of wear caused by axial friction components. This often results in premature wear on these teeth, affecting the reliability of the differential itself. Other partial differential-locking devices are either far too complicated if they are to be reliable, and consequently expensive to build, or far too large for them to fit into a standard differential gear.

SUMMARY OF THE INVENTION

One of the purposes of this invention is to avoid the difficulties mentioned above, and to offer a friction-based differential-locking device that does not exert axial stress on the bevel wheels, and is simple to build and reliable in use.

The friction-based partial differential-locking device for this invention, using a frictional mechanism between each differential sun gear and the crown gear driving the vehicle wheels, is characterized by the fact that this frictional mechanism comprises at least one elastic segment contained under compression in a hole bored in the differential gear housing, this segment exerting radial pressure on the inside surface of the hole. The segment is connected to the sun gear by means of a lug, connected to the relevant sun gear, at least in rotation.

In one embodiment of the invention, this lug is supported by an annular component, connected to the corresponding vehicle wheel shaft, for example by grooves.

In another embodiment, the lug is supported by an annular component, connected to the corresponding sun gear, for example by grooves.

The lug can be made rigidly integral with the corresponding sun gear by any compact, quick-acting method, such as force-fitting into a hole bored in the sun gear, or welding, for example by electron bombardment.

The shape of the segment is such that the radial pressure exerted by it on the inside surface of the differential gear housing hole is spread over in its whole circumference, both when new and when worn. This radial pressure depends on deformation of the segment after its insertion into the hole, and it decreases as the segment wears; wear, however, is reduced by the fact that friction surfaces are submerged in the differential housing oil. Radial pressure exerted by the outside surface of the segment, as a result of its elasticity, on the inside surface of the hole can be increased by a self-tightening effect resulting from friction.

BRIEF DESCRIPTION OF THE DRAWINGS

Other purpose, benefits and features of this invention will emerge from the following description of some of the possible embodiments, with reference to the accompanying drawings.

DESCRIPTION OF SPECIFIC EMBODIMENTS

Figure 1:
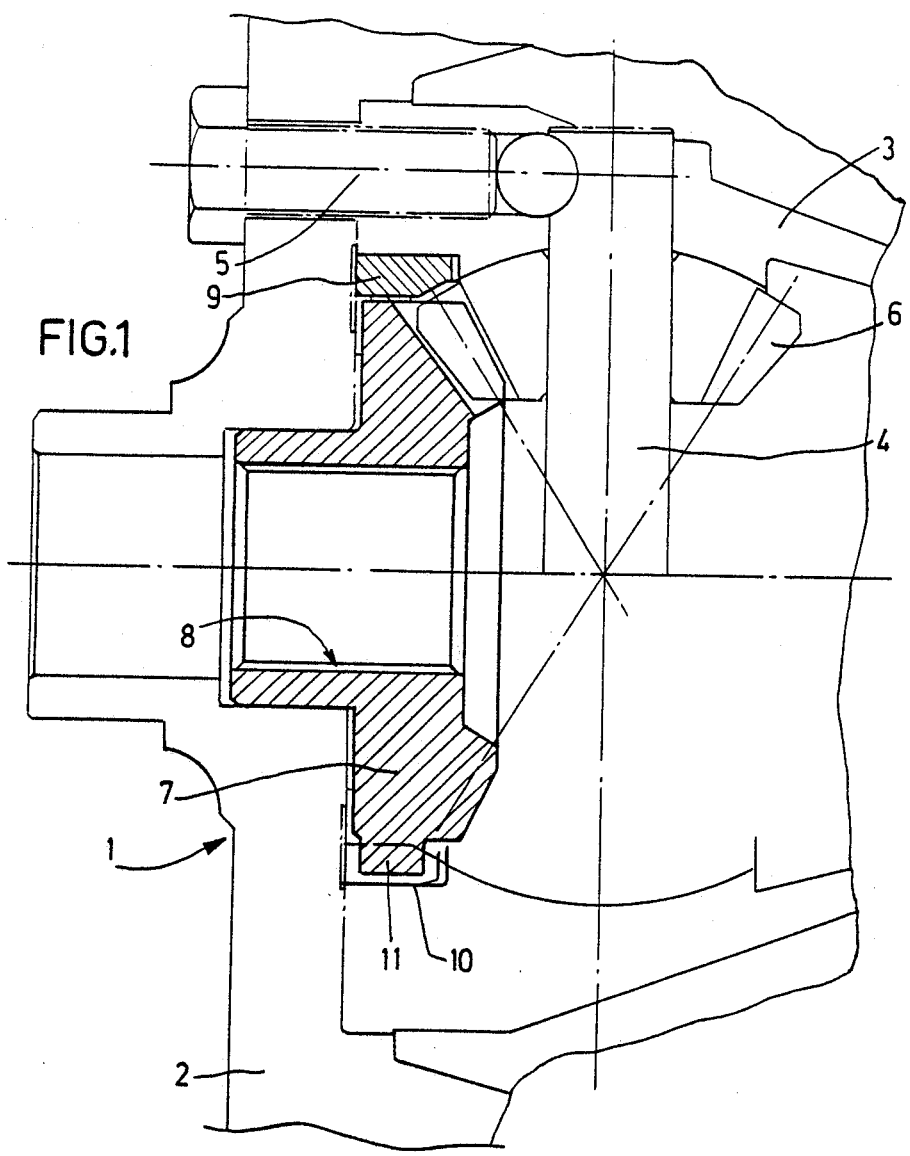
FIG. 1 is a cross-sectional view, with partial representation of the differential housing of a friction-based partial differential-locking device.

FIG. 1 shows the type of differential gear used on commercial road vehicles, with an axle box (not shown here) containing a differential housing 1 comprising a conical gear wheel 2, the teeth (not shown here) of which are made to rotate by a conical pinion wheel connected to the vehicle engine, and an enclosing flange 3, bearing the panel axle or axles 4, held in a fixed position by lock screws 5. The main items of the diffential comprise the set of bevel wheels 6 (only one of which is shown here), which engage on each side of the axle with a bevel gear-wheel 7, containing grooves 8, in contact with the vehicle wheel shaft (not shown here), to drive the left-hand wheel in FIG. 1.

Figure 2:
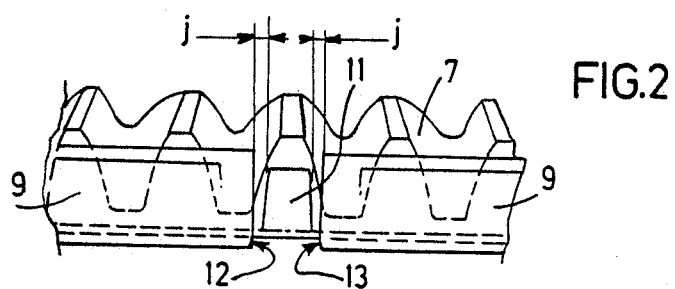
FIG. 2 is a part view from above of the lug connecting the friction segment with the differential sun bevel gear.

An open elastic segment 9 is contained under compression in a hole 10 bored in the flange 3, and a lug 11 on the outer peripheral surface of the bevel wheel 7 fits between the two open surfaces 12 and 13 of the ends of the segment closing on the lug, causing the segment to rotate with the bevel wheel 7, with a clearance j, as shown in FIG. 2.

When a vehicle fitted with this new partial differential-locking mechanism is running normally, the segment 9 remains more or less immobile inside its hole 10, as long as the vehicle is moving in a straight line or round slight curves at moderate speed, due to the frictional forces between the outside surface of the segment 9 and the inside surface of the differential housing. On tight curves taken at speed, the difference in torque between the right-hand and left-hand wheels of the vehicle is sufficient to overcome these frictional forces and the bevel wheel 7, the lug 11 on which under normal circumstances merely strikes the surfaces 12 and 13 of the segment, whenever a difference in torque occurs between the right-hand and left-hand wheels,is thereupon capable of causing the segment to rotate inside its hole.Friction heat produced by this rotation of the segment is easily removed by the housing oil in which the differential is submerged. The segment rotates in this way inside the hole only for limited periods, during which the vehicle is taking bends with high tangential deceleration, and the vehicle's ability to take bends at high speed is not much less than for vehicles of the same type not equipped with this partial differential-locking mechanism.

When the vehicle enters an area where there is serious lack of adherence under one of the driving wheels (which, except for driving on ice or snow, is the common form of lack of adherence), the wheel temporarily lacking adherence tends to race, as a result of the conical engine-driving pinion wheel causing the differential housing to rotate. In this case, the flange 3 rotates round the segment 9, connected in rotation by the lug 11 to the bevel wheel 7, and this produces a frictional driving torque on the segment; this torque is tranmitted to the vehicle wheel moving on the surface with better adherence. The torque transmitted in this way is usually sufficient to allow the vehicle to move away from the patch of bad road. Unlike usual locking systems, this new differential-locking mechanism operates automatically. The lug 11 can be forged or cast together with the bevel wheel 7, or else it can be forced into a hole bored in the wheel, or welded to it, for example by electron bombardment, in order to leave the physical and chemical structure of the high-tensile steel from which the bevel wheel is made, and which is often case-hardened and tempered, intact. In this invention, a segment 9, placed on either of the two wheels 7 for the left-hand and right-hand wheels of the vehicle, is able to cope with lack of adherence on either wheel; however, it is obviously possible to fit two segments, one to each bevel wheel, in which case their effects will combine. The single segment 9, which forms the most convenient and compact embodiment of the invention, may be replaced by several parallel and/or concentric segments, each one connected to a lug 11, in which case these lugs may be positioned round the outside surface of the bevel wheel 7.

Figure 3:
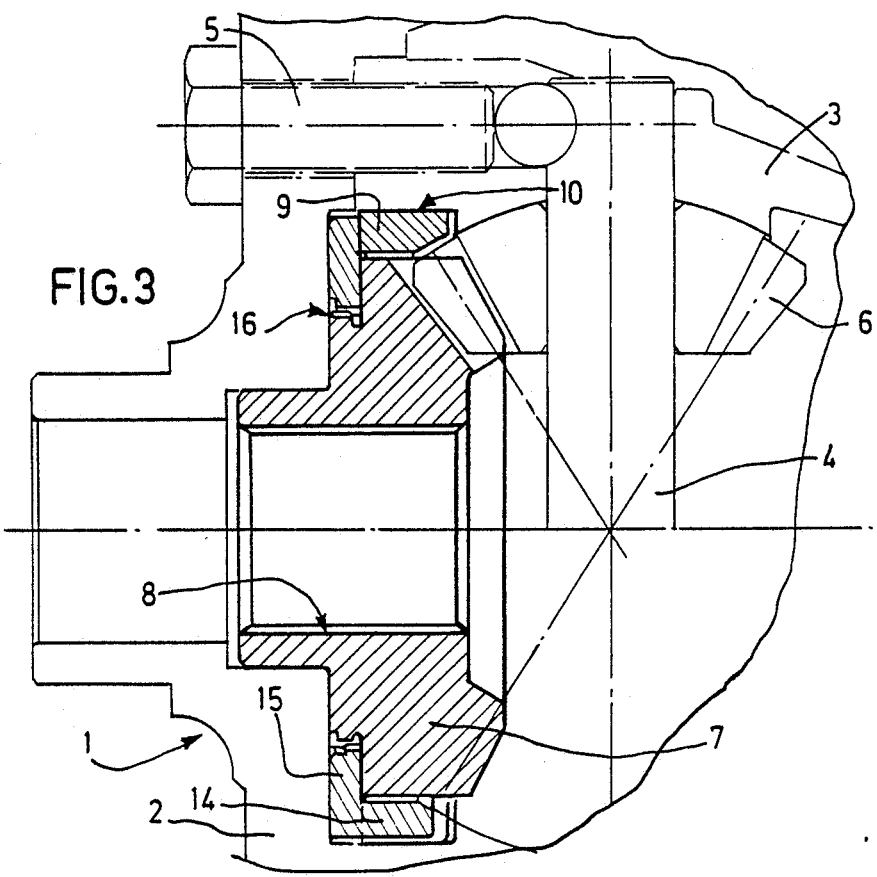
FIG. 3 is a cross-sectional view, with partial representation of the differential housing, of another embodiment of the invention.

FIG. 3 shows another embodiment of the invention, in which the lug 14 connecting the bevel wheel 7 with the segment 9 is supported by an annular component 15, connected in rotation with the bevel wheel 7 by grooves.

Figure 4:
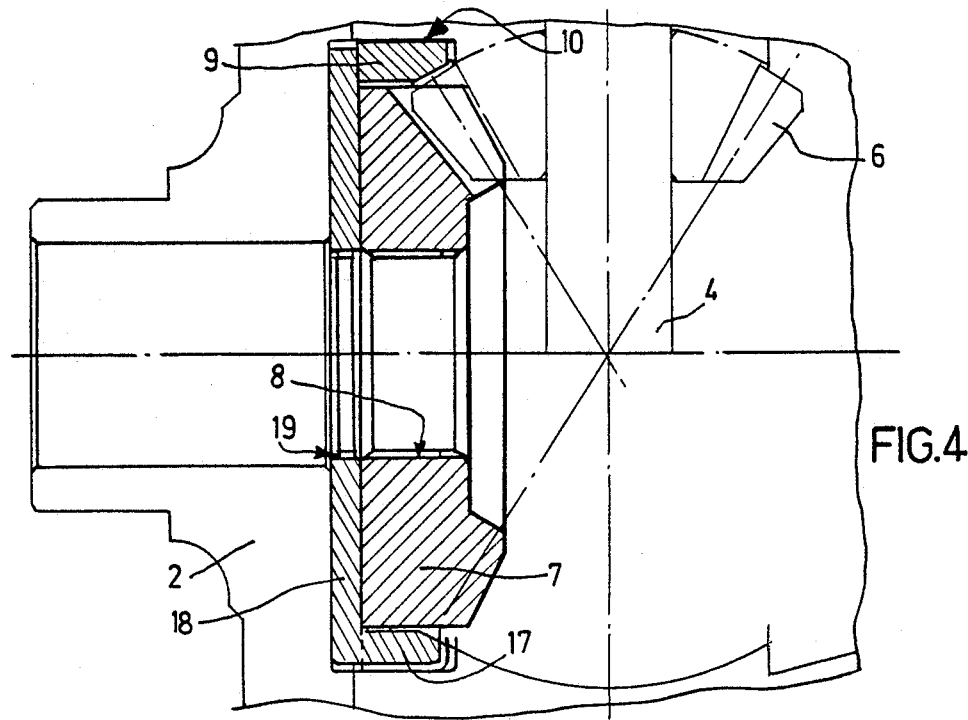
FIG. 4 is a cross-sectional view of the same type, of a third embodiment of the invention.

FIG. 4 shows another embodiment, in which the lug 17 connecting the bevel wheel 7 with the segment 9 is supported by a thin annular component 18, connected in rotation by grooves 19 with the corresponding vehicle wheel shaft which is itself connected by grooves 8 with the bevel wheel 7.

In the embodiments illustrated in FIGS. 3 and 4, it is no longer necessary to attach the lug to the bevel wheel 7, the high-tensile physical and chemical structure of which makes it unsuitable for machining or welding operations. The annular components 15 and 18 also help increase frictional forces and surfaces between the bevel wheel and differential casing 2.

The invention is of course in no way confined to the embodiments described above: many variants are possible for someone skilled in the art, depending on the applications involved, and without any departure from the spirit of the invention.

What is claimed is:

1. A friction-based device for partial locking of a motor vehicle differential with a friction means interposed between at least one bevel gear of the differential and a crown gear connected to a vehicle engine and comprising at least one open elastic segment completely open along a portion thereof to define a slot having two opposing radially extending end faces and contained under compression in a bore in a differential housing, said at least one segment exerting radial pressure on the inside surface of the bore, and a lug rotationally connecting the at least one segment to the corresponding bevel gear, said lug radially protruding into the slot of said at least one open elastic segment with lateral clearance, the lug being integrally welded with the corresponding bevel gear.

2. A device of claim 1, wherein radial pressure exerted by the at least one elastic segment on the inside surface of the bore is reinforced by a self-gripping effect caused by friction between the at least one segment and the bore.

* * * * *